United States Patent
Bharsakale et al.

(10) Patent No.: US 10,988,058 B1
(45) Date of Patent: Apr. 27, 2021

(54) SEAT ASSEMBLY HAVING AN ANTI-SUBMARINE BRACKET

(71) Applicant: Lear Corporation, Southfield, MI (US)

(72) Inventors: Tejas Bharsakale, Pune (IN); Venkateswarulu Kongathi, Pune (IN); Rajiv Kumar, Pune (IN); Ravi Pandharkar, Pune (IN); Kishor Patil, Pune (IN); Anurag Sune, Pune (IN)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 16/883,480

(22) Filed: May 26, 2020

(51) Int. Cl.
*B60N 2/30* (2006.01)
*B60N 2/42* (2006.01)

(52) U.S. Cl.
CPC .......... *B60N 2/3011* (2013.01); *B60N 2/4221* (2013.01)

(58) Field of Classification Search
CPC .. B60N 2/3011; B60N 2/3009; B60N 2/3004; B60N 2/3002; B60N 2/4221; B60N 2/4214; B60N 2/4228
USPC ...................................... 297/216.1
See application file for complete search history.

(56) References Cited

U.S. PATENT DOCUMENTS

| | | | |
|---|---|---|---|
| 5,765,894 A | 6/1998 | Okazaki et al. | |
| 5,927,808 A | 7/1999 | Esker | |
| 6,050,635 A * | 4/2000 | Pajon | B60N 2/4221 297/216.1 |
| 6,450,573 B1 * | 9/2002 | Yamaguchi | B60N 2/4221 297/216.1 |
| 6,679,536 B1 * | 1/2004 | Sonnenberg | B60N 2/3011 296/65.09 |
| 6,932,409 B2 | 8/2005 | Falchero et al. | |
| 7,100,989 B2 | 9/2006 | Andersson et al. | |
| 8,393,681 B2 * | 3/2013 | Gross | B60N 2/42763 297/284.11 |
| 8,408,648 B2 | 4/2013 | Champ | |
| 2002/0053793 A1 * | 5/2002 | Yamaguchi | B60N 2/42763 280/748 |
| 2003/0107232 A1 | 6/2003 | Demptos et al. | |
| 2006/0273645 A1 | 12/2006 | Ferrari et al. | |
| 2007/0182231 A1 | 8/2007 | Lutzka et al. | |
| 2014/0049083 A1 * | 2/2014 | Watanabe | B60N 2/3065 297/331 |
| 2016/0016492 A1 * | 1/2016 | Subramanian | B60N 2/42763 297/216.1 |
| 2019/0225126 A1 * | 7/2019 | Santillan gutierrez | H01R 13/73 |
| 2020/0086772 A1 | 3/2020 | Madhu | |

FOREIGN PATENT DOCUMENTS

FR 2897566 B1 4/2008
FR 3052118 B1 7/2018

* cited by examiner

*Primary Examiner* — Mark R Wendell
(74) *Attorney, Agent, or Firm* — Brooks Kushman PC (57) ABSTRACT

A seat assembly having a seat bottom frame and at least one front mounting bracket assembly. The seat bottom frame may include an anti-submarine tube. The front mounting bracket assembly may have an anti-submarine bracket that may be configured to engage the anti-submarine tube to limit rotation of the seat bottom frame.

20 Claims, 6 Drawing Sheets

SEAT ASSEMBLY HAVING AN ANTI-SUBMARINE BRACKET

TECHNICAL FIELD

This document relates to a seat assembly, such as a fold and tumble seat assembly that has at least one anti-submarine bracket, which may also be called an anti-submarine stopper bracket.

BACKGROUND

A fold and tumble seat assembly is disclosed in U.S. Pat. No. 6,932,409.

SUMMARY

In at least one embodiment, a seat assembly is provided. The seat assembly may include a seat bottom frame and a first front mounting bracket assembly. The seat bottom frame may have a front cross member and an anti-submarine tube. The front cross member may be disposed at a front side of the seat bottom frame. The anti-submarine tube may be spaced apart from the front cross member. The first front mounting bracket assembly may extend from the front cross member and may facilitate rotation of the seat bottom frame about a front axis. The first front mounting bracket assembly may include an anti-submarine bracket. The anti-submarine bracket may extend toward the anti-submarine tube. The anti-submarine tube may be configured to contact the anti-submarine bracket to limit rotation of the seat bottom frame about the front axis.

In at least one embodiment, a seat assembly is provided. The seat assembly may include a seat bottom frame, a first front mounting bracket assembly, and a second front mounting bracket assembly. The seat bottom frame may include a front cross member and an anti-submarine tube. The front cross member may be disposed at a front side of the seat bottom frame. The anti-submarine tube may be spaced apart from the front cross member. The first and second front mounting bracket assemblies may extend from the front cross member and may facilitate rotation of the seat bottom frame about a front axis. The first front mounting bracket assembly may have a first anti-submarine bracket. The second front mounting bracket assembly may have a second anti-submarine bracket. The first anti-submarine bracket and the second anti-submarine bracket may be configured to contact the anti-submarine tube to limit rotation of the seat bottom frame about the front axis.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
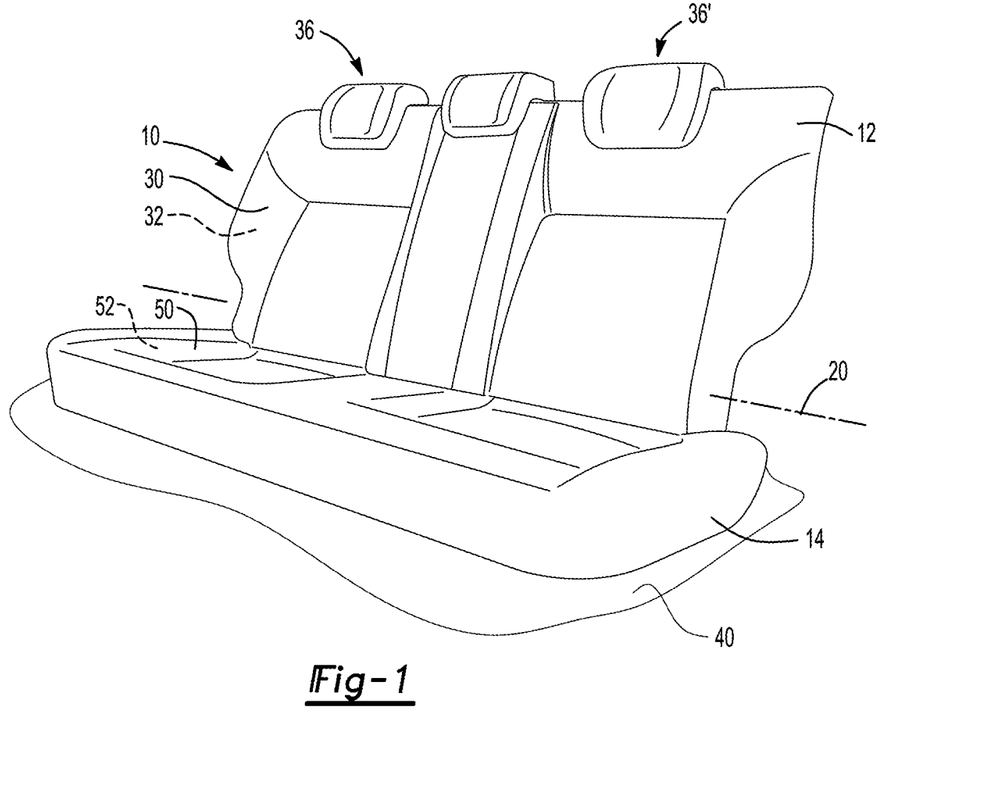
FIG. 1 is a perspective view of an example of a seat assembly.

Referring to FIG. 1, an example of a seat assembly 10 is shown. The seat assembly 10 may be provided with a vehicle, such as a motor vehicle like a car or truck. The seat assembly 10 may be configured as a rear seat that may be positioned behind a front seating row or front seat that may be occupied by a vehicle driver. The seat assembly 10 may include a seat back 12 and a seat bottom 14.

The seat back 12 may be disposed proximate the seat bottom 14 and may be configured to support the back of a seat occupant. The seat back 12 or a portion thereof may be rotatable about an axis 20 with respect to the seat bottom 14. The axis 20 may extend in a generally horizontal direction. In at least one configuration, the seat back 12 may include a trim cover 30, a cushion 32, and a seat back frame 34, which is best shown in FIG. 2.

Referring to FIG. 1, the trim cover 30 may form an exterior surface of at least a portion of the seat back 12. The trim cover 30 may be disposed on the cushion 32 and may at least partially cover or conceal the cushion 32. For example, the trim cover 30 may extend across a front side of the cushion 32 that may be configured to face toward and support a seat occupant. In addition, the trim cover 30 may extend across a top side and opposing lateral sides of the cushion 32. The trim cover 30 may be made of any suitable material, such as fabric, vinyl, leather, or combinations thereof. The trim cover 30 may be mounted on the seat back 12 in any suitable manner. For example, the trim cover 30 may be secured with one or more attachment features, such as a hook, clip, ring, hook and loop fastener, drawstring or the like.

The cushion 32 may be configured to help support a seat occupant. The cushion 32 may be disposed on the seat back frame 34 and may be made of any suitable material. For example, the cushion 32 may be made of a molded polymeric material, such as open cell foam or closed cell foam.

Figure 2:
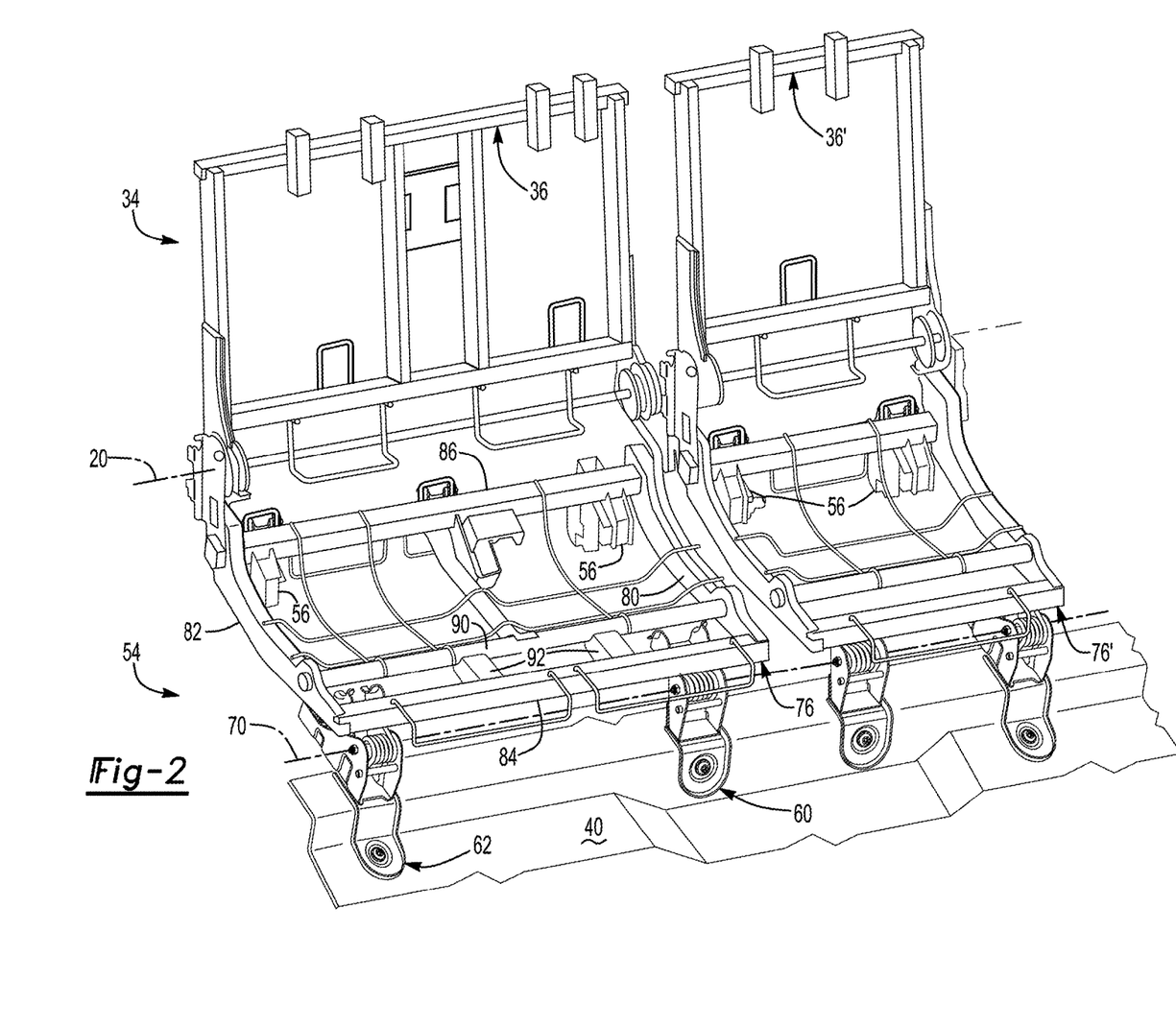
FIG. 2 is a perspective view of a frame of the seat assembly.

Referring to FIG. 2, the trim cover and cushions are omitted to more clearly illustrate the frame of the seat assembly 10. The seat back frame 34 may have one or more seat back portions that may be rotatable about the axis 20 from a generally upright seating position shown in FIG. 1 to a folded position in which at least a portion of the seat back 12 and the seat back frame 34 may be folded over the top of the seat bottom 14. The seating position may be a nominal seating position or normal use position that may allow a person to occupy the seat assembly 10. As such, the seat back 12 may be reclined or angled slightly backward from vertical when in the seating position. A portion of the seat back 12 may contact the seat bottom 14 and/or may extend in a generally horizontal direction when in the folded position.

In the configuration shown in FIG. 2, the seat back frame 34, and hence the seat back 12, is depicted as being split into two portions that may be independently rotatable or pivotable about the axis 20 with respect to each other. For clarity in reference, the portions are numbered from left to right with reference numbers 36 and 36'. The portions 36, 36' may extend laterally across the vehicle or across the width of the seat back 12. The portions 36, 36' may or may not have substantially the same sizes. For example, the seat back 12 and seat back frame 34 in FIGS. 1 and 2 are provided with a 60/40 split configuration in which the portions 36 and 36' have different widths that extend across approximately 60% and 40% of the seat back 12, respectively. It is also contemplated that the seat back frame 34 may be split into more than two portions that may have equal or unequal widths. For instance, the seat back frame 34 may have a 40/20/40 split configuration. It is also contemplated that the seat back frame 34 may not be split.

Referring to FIGS. 1 and 2, the seat bottom 14 may be configured to support the posterior of a seat occupant. The seat bottom 14 may be configured to be mounted on a support structure 40, such as a floor pan of a vehicle. In at least one configuration, the seat bottom 14 may include a trim cover 50, a cushion 52, a seat bottom frame 54, a pair of rear mounting bracket assemblies 56, a first front mounting bracket assembly 60, and a second front mounting bracket assembly 62.

Referring to FIG. 1, the trim cover 50 may form an exterior surface of at least a portion of the seat bottom 14. The trim cover 50 may be disposed on the cushion 52 and may at least partially cover or conceal the cushion 52. For example, the trim cover 50 may extend across a top side of the cushion 52 that may be configured to face toward a seat occupant. In addition, the trim cover 50 may extend across a front side and opposing lateral sides of the cushion 52. The trim cover 50 may be made of any suitable material and may be mounted on the seat bottom 14 in any suitable manner as previously described.

The cushion 52 may be configured to help support a seat occupant. The cushion 52 may be disposed on the seat bottom frame 54 and may be made of any suitable material. For example, the cushion 52 may be made of a molded polymeric material, such as open cell foam or closed cell foam.

Referring to FIG. 2, the seat bottom frame 54, and hence the seat bottom 14, is depicted as being split into two portions that may be independently rotatable or pivotable about a front axis 70 with respect to each other. For clarity in reference, the portions are numbered from left to right with reference numbers 76 and 76'. Portion 36 of the seat back frame 34 may be coupled to portion 76 of the seat bottom frame 54. Portion 36' of the seat back frame 34 may be coupled to portion 76' of the seat bottom frame 54. The portions 76, 76' may or may not have substantially the same sizes and may be provided with a split configuration that may match the split configuration of the seat back frame 34 as previously discussed. It is also contemplated that the seat bottom frame 54 may not be split.

The portions 76, 76' of the seat bottom frame 54 may include a plurality of components. For brevity, the text below will focus on the configuration of portion 76; however, one or more other portions of the seat bottom frame 54 may be provided with a similar configuration or the same configuration as portion 76. For instance, in at least one configuration, the portions 76, 76' of the seat bottom frame 54 may include a first lateral side member 80, a second lateral side member 82, a front cross member 84, and a rear cross member 86. At least one portion 76, 76' of the seat bottom frame 54 may also include an anti-submarine tube 90 and at least one support member 92.

The first lateral side member 80 may be disposed along a lateral side of a portion of the seat bottom frame 54. The first lateral side member 80 may extend in a forward/backward direction that may be substantially perpendicular to the front axis 70. The front axis 70 may be disposed substantially parallel to the axis 20.

The second lateral side member 82 may be disposed opposite the first lateral side member 80. The second lateral side member 82 may extend substantially parallel to the first lateral side member 80.

The front cross member 84 may be disposed at a front side of the seat bottom frame 54 that may be positioned at an opposite end of the seat bottom frame 54 from the seat back 12. The front cross member 84 may extend from the first lateral side member 80 to the second lateral side member 82. The front cross member 84 may be fixedly coupled to the first lateral side member 80 and the second lateral side member 82 in any suitable manner, such as by welding or with one or more fasteners. It is also contemplated that the front cross member 84 may be integrally formed with the first lateral side member 80, the second lateral side member 82, or both. In at least one configuration, the front cross member 84 may be positioned above the front axis 70 and may extend substantially parallel to the front axis 70.

The rear cross member 86 may be disposed at a rear side of the seat bottom frame 54. As such, the rear cross member 86 may be disposed opposite the front cross member 84. The rear cross member 86 may extend from the first lateral side member 80 to the second lateral side member 82. The rear cross member 86 may be fixedly coupled to or integrally formed with the first lateral side member 80, the second lateral side member 82, or both. The rear cross member 86 may generally positioned below the seat back 12 and below the axis 20.

Figure 3:
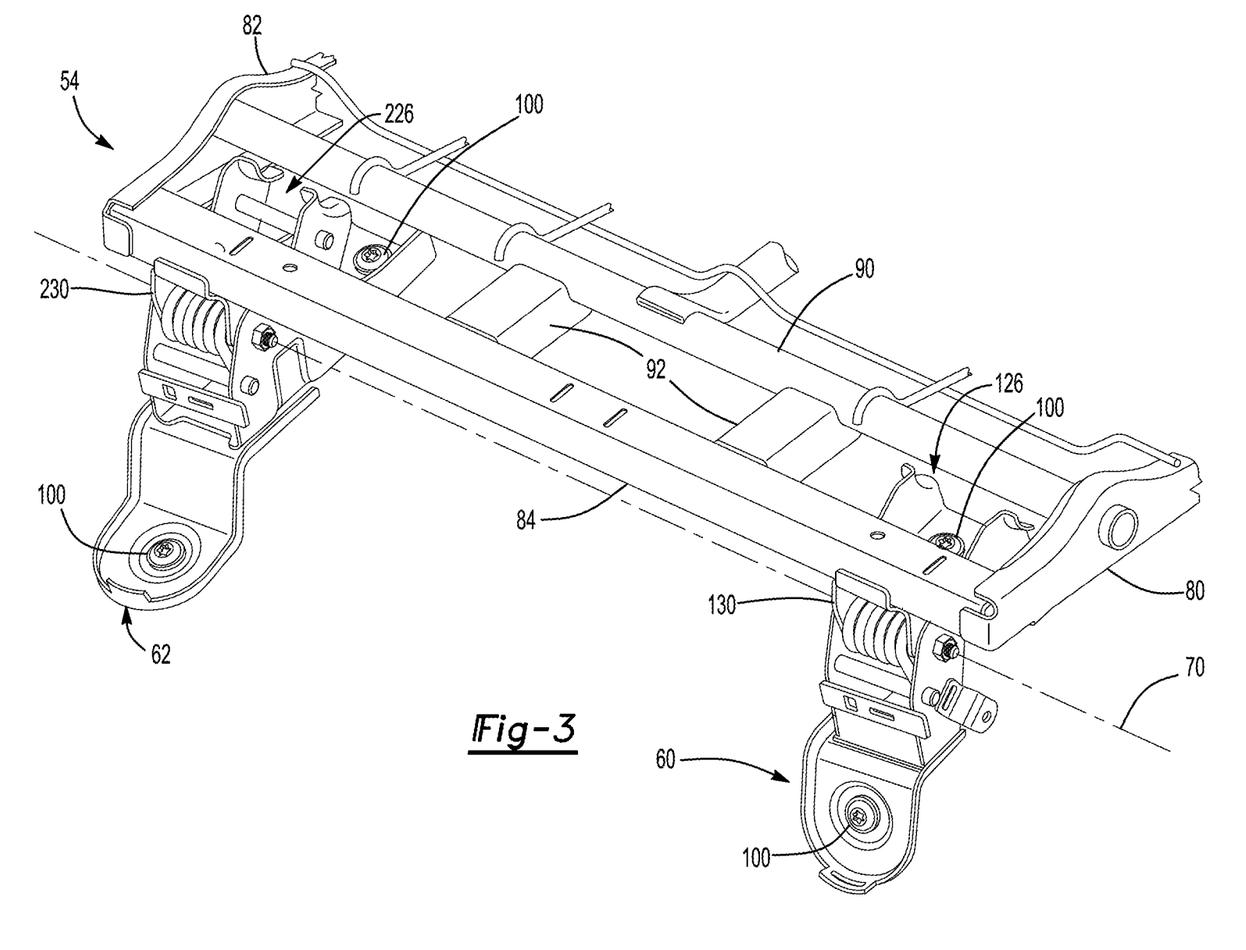
FIG. 3 is a magnified perspective view of a portion of a seat bottom frame of the seat assembly.

Referring to FIGS. 2 and 3, the anti-submarine tube 90 may be positioned between the front cross member 84 and the rear cross member 86. In addition, the anti-submarine tube 90 may be spaced apart from the front cross member 84 and the rear cross member 86. The anti-submarine tube 90 may extend from the first lateral side member 80 to the second lateral side member 82. In addition, the anti-submarine tube 90 may be fixedly coupled to the first lateral side member 80 and the second lateral side member 82. The anti-submarine tube 90 or a portion thereof may extend substantially parallel to the front axis 70 and the front cross member 84. In addition, the anti-submarine tube 90 may be positioned closer to the front cross member 84 than the rear cross member 86.

At least one support member 92 may extend from the front cross member 84 to the anti-submarine tube 90. A support member 92 may be fixedly attached to the front cross member 84 and the anti-submarine tube 90 in any suitable manner, such as by welding, with one or more fasteners, or combinations thereof. A support member 92 may help reinforce the seat bottom frame 54 and may help inhibit movement of at least a portion of the anti-submarine tube 90 with respect to the front cross member 84. In the configuration shown, two support members 92 are illustrated; however, it is contemplated that a greater or lesser number of support members 92 may be provided. For convenience in reference, the support members may be referred to as a first support member and a second support member. The first support member 92 may be axially positioned or positioned in a direction that extends along the front axis 70 closer to the first lateral side member 80 than the second lateral side member 82. As such, the first support member 92 may be positioned closer to the first front mounting bracket assembly 60 than the second support member 92. The second support member 92 may be spaced apart from the first support member 92 and may be axially positioned closer to the second lateral side member 82 than the first lateral side member 80. As such, the second support member 92 may be positioned closer to the second front mounting bracket assembly 62 than the first support member 92. The first support member 92 and the second support member 92 may also be spaced apart from and axially positioned between the first front mounting bracket assembly 60 and the second front mounting bracket assembly 62.

Referring to FIG. 2, the rear mounting bracket assemblies 56 may selectively couple the seat bottom frame 54 to the to the support structure 40 of the vehicle. In at least one configuration, the rear mounting bracket assemblies 56 may be fixedly mounted to the seat bottom frame 54. For instance, a rear mounting bracket assembly 56 may be fixedly coupled to the first lateral side member 80, second lateral side member 82, or the rear cross member 86. The rear mounting bracket assemblies 56 may each include a latch that may receive and grasp a striker that may be provided with and may be fixedly mounted to the support structure 40. The seat assembly 10 may not be rotatable about the front axis 70 when a rear mounting bracket assembly 56 is secured to the striker. Conversely, the seat assembly 10 may be rotatable about the front axis 70 when the rear mounting bracket assemblies 56 are released from and not secured to their associated strikers.

In at least one configuration, the seat assembly 10 may be configured to fold and tumble between a seating position such as is shown in FIGS. 1 and 2 and a stowed position in which the seat assembly 10 may be folded and flipped forward from the seating position to facilitate storage. More specifically, the seat assembly 10 may be moved from the seating position to the stowed position by rotating the seat back 12 about the axis 20 to fold the seat back 12 over the seat bottom 14 and by releasing the rear mounting bracket assemblies 56 from their associated strikers to permit the folded seat back 12 and the seat bottom 14 to rotate together about the front axis 70 in a direction that extends away from the strikers.

Referring to FIGS. 2 and 3, the first front mounting bracket assembly 60 and the second front mounting bracket assembly 62 may couple the seat bottom frame 54 to the support structure 40 and may facilitate rotation of the seat assembly 10 about the front axis 70. The first front mounting bracket assembly 60 and the second front mounting bracket assembly 62 may have the same configuration or different configurations depending on the configuration of the support structure 40. In the configuration shown, the first front mounting bracket assembly 60 and the second front mounting bracket assembly 62 have different configurations.

Figure 4:
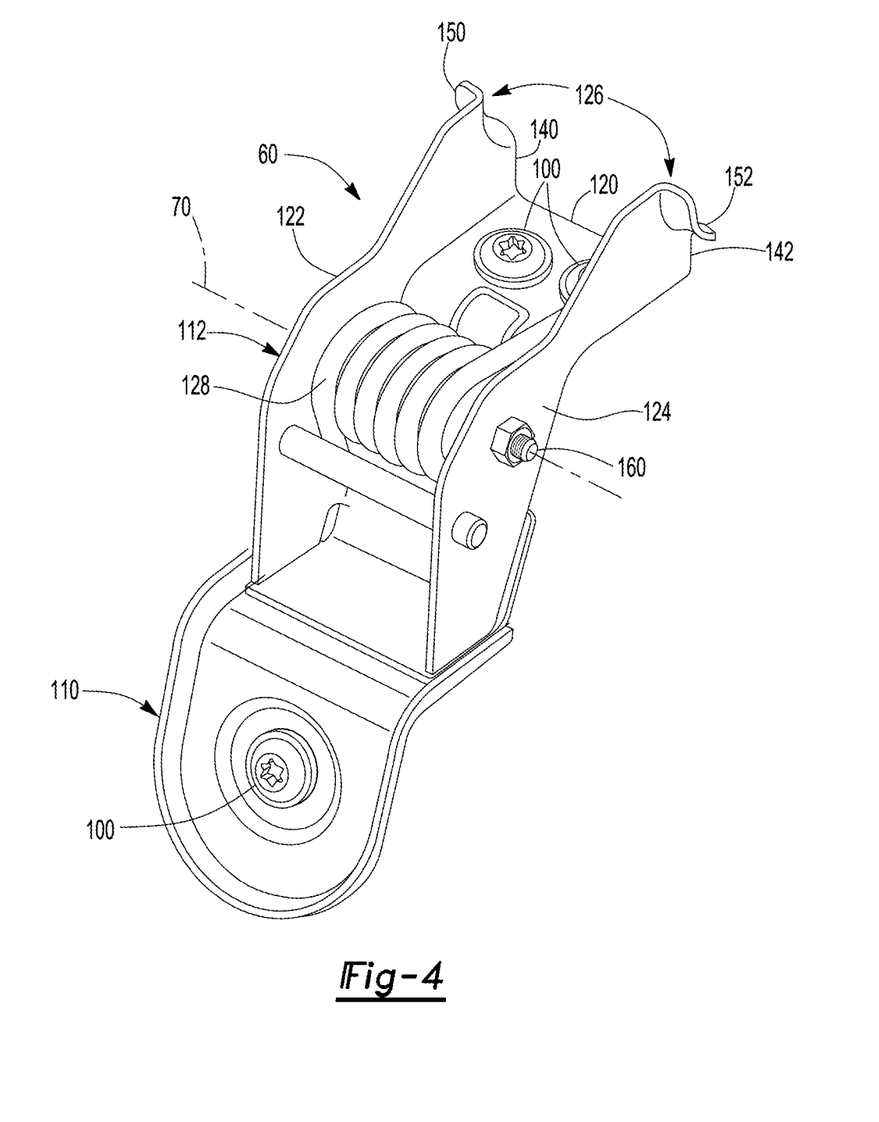
FIG. 4 is a perspective view of a first front mounting bracket assembly that may be provided with the seat assembly.

Referring to FIGS. 3 and 4, the first front mounting bracket assembly 60 may extend from the support structure 40 to the front cross member 84 and may facilitate rotation about the front axis 70. The first front mounting bracket assembly 60 may be fixedly mounted to the support structure 40 in any suitable manner, such as with one or more fasteners 100 like a bolt. In at least one configuration, the first front mounting bracket assembly 60 may include a lower portion 110 and an upper portion 112.

The lower portion 110 may be disposed on the support structure 40 and may be fixedly mounted to the support structure 40. For instance, a fastener 100 may extend through a hole in the lower portion 110. It is also contemplated that the lower portion 110 may be omitted in one or more configurations.

The upper portion 112 may be disposed above the lower portion 110. In addition, the upper portion 112 may extend rearward from the lower portion 110. In at least one configuration, the upper portion 112 may include a center panel 120, a first side panel 122, a second side panel 124, an anti-submarine bracket 126, a biasing member 128, and a mounting member 130. For clarity, the mounting member 130 is shown in FIG. 3 and omitted in FIG. 4.

The center panel 120 may be disposed on the support structure 40 and may be positioned between the first side panel 122 and the second side panel 124. The center panel 120 may be fixedly mounted to the support structure 40. For instance, a fastener 100 may extend through a hole in the center panel 120. The center panel 120 may be spaced apart from the front cross member 84 and the anti-submarine tube 90.

The first side panel 122 may extend from an end or edge of the center panel 120. For instance, the first side panel 122 may extend in an upward direction from the center panel 120 toward the seat bottom frame 54. In at least one configuration, the first side panel 122 may be integrally formed with the center panel 120 and may be disposed substantially perpendicular to the center panel 120 or a portion thereof. The first side panel 122 may be spaced apart from the front cross member 84 and the anti-submarine tube 90.

The second side panel 124 may be disposed opposite the first side panel 122. The second side panel 124 may extend from an end or edge of the center panel 120 that may be disposed opposite the first side panel 122. For instance, the second side panel 124 may extend in an upward direction from the center panel 120 toward the seat bottom frame 54. In at least one configuration, the second side panel 124 may be integrally formed with the center panel 120 and may be disposed substantially parallel to the first side panel 122. The second side panel 124 may be spaced apart from the front cross member 84 and the anti-submarine tube 90.

Figure 6:
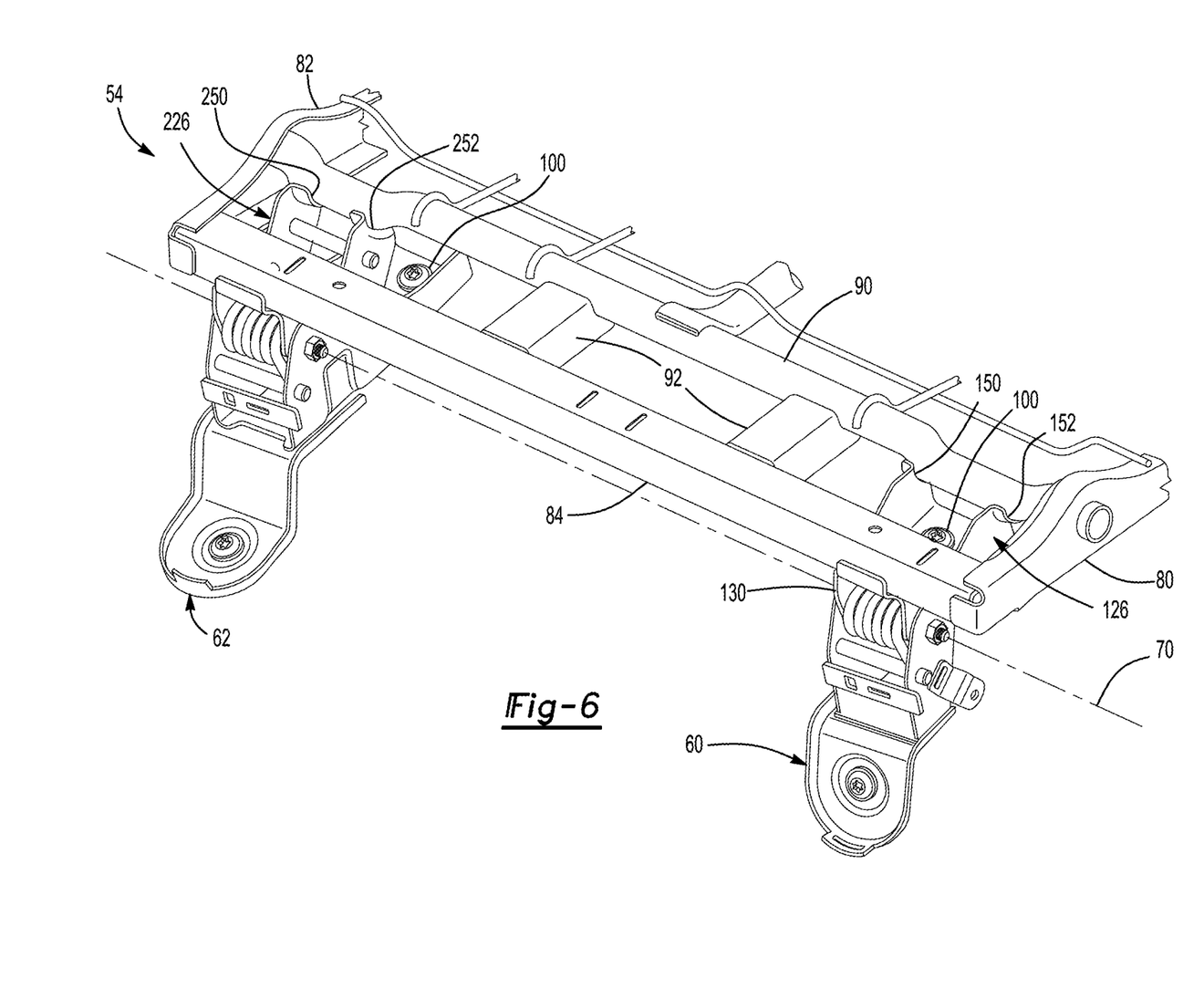
FIG. 6 is a magnified perspective view of a portion of the seat bottom frame illustrating an anti-submarine tube of the seat bottom frame contacting the first and second front mounting bracket assemblies.

The anti-submarine bracket 126 may extend toward the anti-submarine tube 90. As is best shown in FIG. 3, the anti-submarine bracket 126 may be positioned between the front cross member 84 and the anti-submarine tube 90 and may extend toward the anti-submarine tube 90. In addition, the anti-submarine bracket 126 may be laterally positioned between and may be spaced apart from the first lateral side member 80 and the second lateral side member 82. The anti-submarine bracket 126 may normally be spaced apart from the anti-submarine tube 90 as shown in FIG. 3. For instance, the anti-submarine bracket 126 may be spaced apart from the anti-submarine tube 90 when the anti-submarine tube 90 is in its design position or design configuration, such as when the anti-submarine tube 90 extends substantially parallel to the front axis 70. As is shown in FIG. 6, the anti-submarine bracket 126 may receive and may contact the anti-submarine tube 90 when the anti-submarine tube 90 or a portion of the seat bottom frame 54 is deformed and the anti-submarine tube 90 moves forward, such as in response to a front vehicle impact event. As such, the anti-submarine bracket 126 may act as a stop that may limit movement of the anti-submarine tube 90 and limit rotation of the seat bottom frame 54 about the front axis 70.

Referring primarily to FIG. 4, the anti-submarine bracket 126 may be integrally formed with other components of the upper portion 112 or may be provided as one or more separate components. In the configuration shown, the anti-submarine bracket 126 may include a first flange 140 and a second flange 142.

The first flange 140 may be positioned between the front cross member 84 and the anti-submarine tube 90. In at least one configuration, the first flange 140 may be part of the first side panel 122 and may be integrally formed with the first side panel 122. The first flange 140 may extend upward from the center panel 120 toward the seat bottom frame 54. Moreover, the first flange 140 may extend above the biasing member 128 and may be longitudinally positioned closer to the anti-submarine tube 90 than the biasing member 128. In at least one configuration, the first flange 140 may have a first contact portion 150.

The first contact portion 150 may be configured to contact the anti-submarine tube 90. The first contact portion 150 may be disposed at an end of the first flange 140. In at least one configuration, the first contact portion 150 may extend along an arc and may be configured to receive the anti-submarine tube 90 when a portion of the seat bottom frame 54 is distorted.

The second flange 142 may be spaced apart from the first flange 140. Like the first flange 140, the second flange 142 may be positioned between the front cross member 84 and the anti-submarine tube 90. In at least one configuration, the second flange 142 may be part of the second side panel 124 and may be integrally formed with the second side panel 124. The second flange 142 may extend upward from the center panel 120. Moreover, the second flange 142 may extend above the biasing member 128 and may be longitudinally positioned closer to the anti-submarine tube 90 than the biasing member 128. In at least one configuration, the second flange 142 may have a second contact portion 152.

The second contact portion 152 may be configured to contact the anti-submarine tube 90. The second contact portion 152 may be disposed at an end of the second flange 142. In at least one configuration, the second contact portion 152 may extend along an arc and may be configured to receive the anti-submarine tube 90 when a portion of the seat bottom frame 54 is distorted. In at least one configuration, the first contact portion 150 and the second contact portion 152 may be aligned with each other and may be disposed substantially parallel to each other. The first contact portion 150 and the second contact portion 152 may extend in the same direction or different directions. In the configuration shown, the first contact portion 150 and the second contact portion 152 extend in opposite directions with respect to each other and thus extend away from the center panel 120.

The biasing member 128 may be mounted to a portion of the first front mounting bracket assembly 60, such as the upper portion 112. The biasing member 128 may exert a biasing force that may urge the seat bottom frame 54 to rotate about the front axis 70, such as in a forward direction or counterclockwise direction from the perspective shown. In at least one configuration, the biasing member 128 may include coils that may extend around the front axis 70.

Referring to FIG. 3, the mounting member 130 may connect the seat bottom frame 54 to the first front mounting bracket assembly 60. For instance, the mounting member 130 may be fixedly disposed on the front cross member 84 and may be rotatably connected to the upper portion 112 of the first front mounting bracket assembly 60. For example, the mounting member 130 may be rotatably connected to the first side panel 122 and the second side panel 124 with one or more mounting pins 160 that may extend along and facilitate rotation about the front axis 70.

Figure 5:
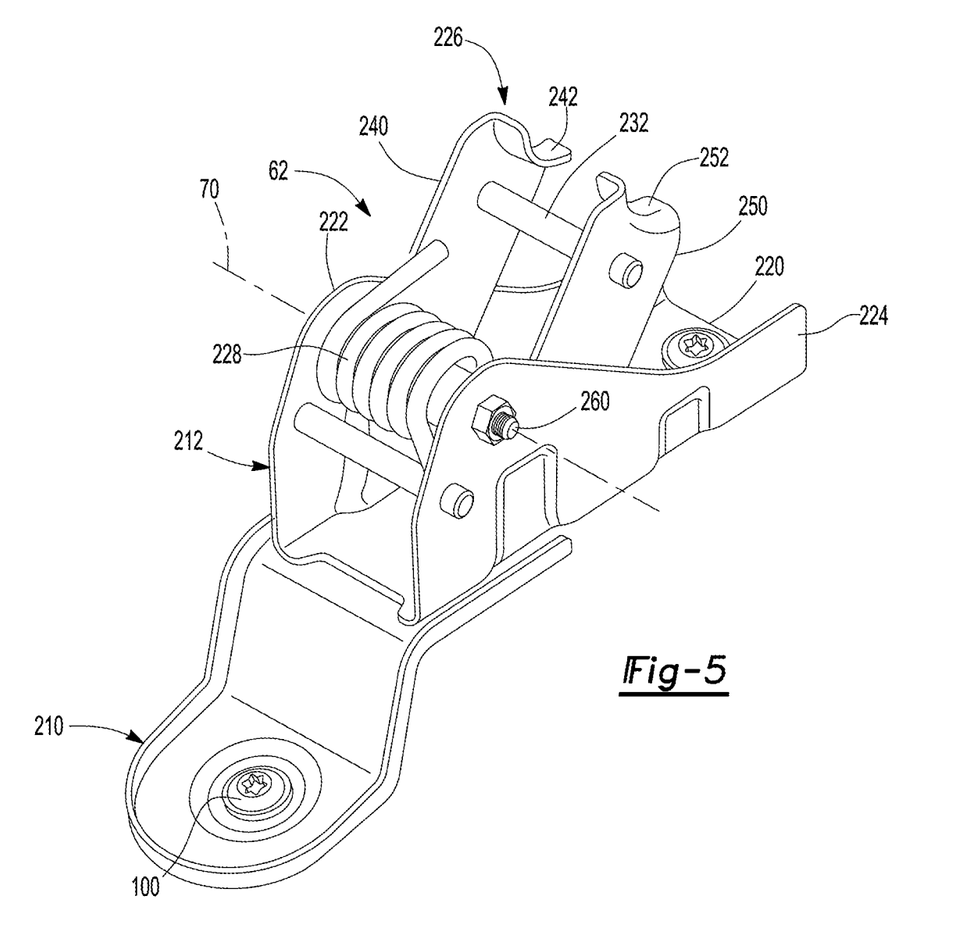
FIG. 5 is a perspective view of a second front mounting bracket assembly that may be provided with the seat assembly.

Referring to FIGS. 3 and 5, the second front mounting bracket assembly 62 may extend from the support structure 40 to the front cross member 84 and may facilitate rotation about the front axis 70. The second front mounting bracket assembly 62 may be fixedly mounted to the support structure 40 in any suitable manner, such as with one or more fasteners 100. In at least one configuration, the second front mounting bracket assembly 62 may include a lower portion 210 and an upper portion 212.

The lower portion 210 may be disposed on the support structure 40 and may be fixedly mounted to the support structure 40. For instance, a fastener 100 may extend through a hole in the lower portion 210. It is also contemplated that the lower portion 210 may be omitted in one or more configurations.

The upper portion 212 may be disposed above the lower portion 210. In addition, the upper portion 212 may extend rearward from the lower portion 210. In at least one configuration, the upper portion 212 may include a center panel 220, a first side panel 222, a second side panel 224, an anti-submarine bracket 226, a biasing member 228, a mounting member 230, and a reinforcement pin 232. For clarity, the mounting member 230 is shown in FIG. 3 and omitted in FIG. 5.

The center panel 220 may be disposed on the support structure 40 and may be positioned between the first side panel 222 and the second side panel 224. The center panel 220 may be fixedly mounted to the support structure 40. For instance, a fastener 100 may extend through a hole in the center panel 220. The center panel 220 may be spaced apart from the front cross member 84 and the anti-submarine tube 90.

The first side panel 222 may extend from an end or edge of the center panel 220. For instance, the first side panel 222 may extend in an upward direction from the center panel 220 toward the seat bottom frame 54. In at least one configuration, the first side panel 222 may be integrally formed with the center panel 220 and may be disposed substantially perpendicular to the center panel 220 or a portion thereof. The first side panel 222 may be spaced apart from the front cross member 84 and the anti-submarine tube 90.

The second side panel 224 may be disposed opposite the first side panel 222. The second side panel 224 may extend from an end or edge of the center panel 220 that may be disposed opposite the first side panel 222. For instance, the second side panel 224 may extend in an upward direction from the center panel 220 toward the seat bottom frame 54. In at least one configuration, the second side panel 224 may be integrally formed with the center panel 220 and may be disposed substantially parallel to the first side panel 222. The second side panel 224 may be spaced apart from the front cross member 84 and the anti-submarine tube 90.

The anti-submarine bracket 226 may extend toward the anti-submarine tube 90. As is best shown in FIG. 3, the anti-submarine bracket 226 may be positioned between the front cross member 84 and the anti-submarine tube 90 and may extend toward the anti-submarine tube 90. In addition, the anti-submarine bracket 226 may be laterally positioned between and may be spaced apart from the first lateral side member 80 and the second lateral side member 82. The anti-submarine bracket 226 may normally be spaced apart from the anti-submarine tube 90. For instance, the anti-submarine bracket 226 may be spaced apart from the anti-submarine tube 90 when the anti-submarine tube 90 is in its design position or design configuration. As is shown in FIG. 6, the anti-submarine bracket 226 may receive and may contact the anti-submarine tube 90 when the anti-submarine tube 90 or a portion of the seat bottom frame 54 is deformed and the anti-submarine tube 90 moves forward, such as in response to a front vehicle impact event. As such, the anti-submarine bracket 226 may act as a stop that may limit movement of the anti-submarine tube 90 and limit rotation of the seat bottom frame 54 about the front axis 70.

Referring primarily to FIG. 5, the anti-submarine bracket 226 may be integrally formed with other components of the upper portion 212 or may be provided as a separate component. In the configuration shown, the anti-submarine bracket 226 includes parts that are separate from the upper portion 212 and are fixedly attached to the upper portion 212. The anti-submarine bracket 226 may include a first flange 240 and a second flange 242.

The first flange 240 may be positioned between the front cross member 84 and the anti-submarine tube 90. In at least one configuration, the first flange 240 is a separate component from the first side panel 222 that is fixedly attached to the first side panel 222. The first flange 240 may extend upward from the center panel 220 toward the seat bottom frame 54. Moreover, the first flange 240 may extend above the biasing member 228 and may be longitudinally positioned closer to the anti-submarine tube 90 than the biasing member 228. In at least one configuration, the first flange 240 may have a first contact portion 250.

The first contact portion 250 may be configured to contact the anti-submarine tube 90. The first contact portion 250 may be disposed at an end of the first flange 240. In at least one configuration, the first contact portion 250 may extend along an arc and may be configured to receive the anti-submarine tube 90 when a portion of the seat bottom frame 54 is distorted.

The second flange 242 may be spaced apart from the first flange 240. Like the first flange 240, the second flange 242 may be positioned between the front cross member 84 and the anti-submarine tube 90. In at least one configuration, the second flange 242 may be a separate component from the second side panel 224 that is fixedly attached to the second side panel 224. The second flange 242 may extend upward from the center panel 220. Moreover, the second flange 242 may extend above the biasing member 228 and may be longitudinally positioned closer to the anti-submarine tube 90 than the biasing member 228. In at least one configuration, the second flange 242 may have a second contact portion 252.

The second contact portion 252 may be configured to contact the anti-submarine tube 90. The second contact portion 252 may be disposed at an end of the second flange 242. In at least one configuration, the second contact portion 252 may extend along an arc and may be configured to receive the anti-submarine tube 90 when a portion of the seat bottom frame 54 is distorted. In at least one configuration, the first contact portion 250 and the second contact portion 252 may be aligned with each other and may be disposed substantially parallel to each other. The first contact portion 250 and the second contact portion 252 may extend in the same direction or different directions. In the configuration shown, the first contact portion 250 and the second contact portion 252 extend toward each other.

The biasing member 228 may be mounted to a portion of the second front mounting bracket assembly 62, such as the upper portion 212. The biasing member 228 may exert a biasing force that may urge the seat bottom frame 54 to rotate about the front axis 70, such as in a forward direction or counterclockwise direction from the perspective shown. In at least one configuration, the biasing member 228 may include coils that may extend around the front axis 70.

Referring to FIG. 3, the mounting member 230 may connect the seat bottom frame 54 to the second front mounting bracket assembly 62. For instance, the mounting member 230 may be fixedly disposed on the front cross member 84 and may be rotatably connected to the upper portion 212 of the second front mounting bracket assembly 62. For example, the mounting member 230 may be rotatably connected to the first side panel 222 and the second side panel 224 with one or more mounting pins 260 that may extend along and facilitate rotation about the front axis 70.

The reinforcement pin 232 may extend from the first flange 240 to the second flange 242. In addition, the reinforcement pin 232 may be fixedly coupled to the first flange 240 and the second flange 242 in any suitable manner, such as by welding, one or more fasteners, an interference fit, or combinations thereof. The reinforcement pin 232 may help reinforce and maintain the orientation of the first flange 240 and the second flange 242.

The configurations described above may help the seat assembly better withstand load forces and maintain its position. For instance, the anti-submarine tube may contact the anti-submarine brackets and may help limit or inhibit rotation of the seat assembly about the front axis, about the strikers, or both, which may help limit displacement or movement of an object in the seat.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A seat assembly comprising:
   a seat bottom frame having a front cross member disposed at a front side of the seat bottom frame and an anti-submarine tube that is spaced apart from the front cross member; and
   a first front mounting bracket assembly that extends from the front cross member and facilitates rotation of the seat bottom frame about a front axis, wherein the first front mounting bracket assembly includes:
   a center panel that is spaced apart from the seat bottom frame and that is configured to engage a vehicle;
   a first side panel that extends from the center panel toward the front cross member;
   a second side panel that extends from the center panel toward the front cross member, wherein the second side panel is disposed opposite and is spaced apart from the first side panel;
   a mounting pin that extends from the first side panel to the second side panel and extends along the front axis;
   a biasing member that urges the seat bottom frame to rotate about the front axis, wherein the biasing member encircles the mounting pin and is disposed between the first side panel and the second side panel; and
   a mounting member that is fixedly disposed on the front cross member and that is rotatably connected to the first side panel and the second side panel by the mounting pin.

2. The seat assembly of claim 1 further comprising a second front mounting bracket assembly that extends from the front cross member and facilitates rotation of the seat bottom frame about the front axis, and a first support member that extends from the front cross member to the anti-submarine tube, wherein the first support member is axially positioned between the first front mounting bracket assembly and the second front mounting bracket assembly.

3. The seat assembly of claim 1 wherein the first front mounting bracket assembly further comprises a pin that extends from the first side panel to the second side panel, is disposed substantially parallel to the mounting pin, and is disposed closer to the center panel than the mounting pin is disposed to the center panel, wherein the biasing member engages the pin.

4. The seat assembly of claim 1 wherein the first front mounting bracket assembly is configured to be fixedly mounted to the vehicle.

5. A seat assembly comprising:
a seat bottom frame having a front cross member disposed at a front side of the seat bottom frame and an anti-submarine tube that is spaced apart from the front cross member; and
a first front mounting bracket assembly that extends from the front cross member and facilitates rotation of the seat bottom frame about a front axis, wherein the first front mounting bracket assembly has an anti-submarine bracket that extends toward the anti-submarine tube, wherein the anti-submarine tube is configured to contact the anti-submarine bracket to limit rotation of the seat bottom frame about the front axis and the anti-submarine bracket includes a first flange and a second flange that are spaced apart from each other and are positioned between the front cross member and the anti-submarine tube.

6. The seat assembly of claim 5 wherein the first flange and the second flange are spaced apart from the front cross member.

7. The seat assembly of claim 5 wherein the first flange and the second flange extend upward from a center panel that is configured to be mounted to a vehicle.

8. The seat assembly of claim 5 further comprising a biasing member that is mounted to the first front mounting bracket assembly and urges the seat bottom frame to rotate about the front axis, wherein the first flange and the second flange extend above the biasing member and are positioned closer to the anti-submarine tube than the biasing member.

9. The seat assembly of claim 5 wherein the first flange has a first contact portion that is disposed at an end of the first flange, the second flange has a second contact portion that is disposed at an end of the second flange, and the first contact portion and the second contact portion extend along an arc and are configured to receive the anti-submarine tube.

10. The seat assembly of claim 9 wherein the first contact portion and the second contact portion are disposed substantially parallel to each other and extend in opposite directions with respect to each other.

11. A seat assembly comprising:
a seat bottom frame that includes:
a front cross member disposed at a front side of the seat bottom frame; and
an anti-submarine tube that is spaced apart from the front cross member; and
first and second front mounting bracket assemblies that extend from the front cross member and facilitate rotation of the seat bottom frame about a front axis, wherein the first front mounting bracket assembly has a first anti-submarine bracket, the second front mounting bracket assembly has a second anti-submarine bracket, wherein the first anti-submarine bracket and the second anti-submarine bracket are configured to contact the anti-submarine tube to limit rotation of the seat bottom frame about the front axis.

12. The seat assembly of claim 11 wherein the first front mounting bracket assembly and the second front mounting bracket assembly have different configurations.

13. The seat assembly of claim 11 further comprising a first support member that extends from the front cross member to the anti-submarine tube, wherein the first support member is axially positioned between the first front mounting bracket assembly and the second front mounting bracket assembly.

14. The seat assembly of claim 13 further comprising a second support member that extends from the front cross member to the anti-submarine tube and is spaced apart from the first support member, wherein the first support member is disposed closer to the first front mounting bracket assembly than the second front mounting bracket assembly and the second support member is disposed closer to the second front mounting bracket assembly than the first front mounting bracket assembly.

15. The seat assembly of claim 14 wherein the second front mounting bracket assembly is configured to be fixedly mounted to a vehicle and second anti-submarine bracket includes a first flange and a second flange that are spaced apart from each other and are positioned between the front cross member and the anti-submarine tube.

16. The seat assembly of claim 15 wherein the first flange has a first contact portion that is disposed at an end of the first flange, the second flange has a second contact portion that is disposed at an end of the second flange, and the first contact portion and the second contact portion extend along an arc and are configured to receive the anti-submarine tube.

17. The seat assembly of claim 16 wherein the first contact portion and the second contact portion are disposed substantially parallel to each other and extend toward each other.

18. The seat assembly of claim 15 wherein a reinforcement pin extends from the first flange to the second flange.

19. The seat assembly of claim 15 wherein the first flange and the second flange are spaced apart from the front cross member.

20. The seat assembly of claim 15 wherein the second front mounting bracket assembly includes a center panel that is configured to be mounted to the vehicle, a first side panel that extends from the center panel, and a second side panel that extends from the center panel and is disposed opposite the first side panel, wherein the first flange is disposed on the first side panel and the second flange is disposed on the second side panel.

* * * * *